United States Patent
Figus et al.

(10) Patent No.: US 8,768,887 B2
(45) Date of Patent: Jul. 1, 2014

(54) GENERATING AND BINDING NOTES TO BUSINESS OBJECTS

(75) Inventors: Daniel Figus, Wallduern (DE); Sebastian Droll, Duttenbrunn (DE)

(73) Assignee: SAP AG, Walldorf (DE)

(*) Notice: Subject to any disclaimer, the term of this patent is extended or adjusted under 35 U.S.C. 154(b) by 646 days.

(21) Appl. No.: 12/639,034

(22) Filed: Dec. 16, 2009

(65) Prior Publication Data

US 2011/0145194 A1 Jun. 16, 2011

(51) Int. Cl.
*G06F 17/30* (2006.01)

(52) U.S. Cl.
USPC ............... 707/636; 707/803; 707/705

(58) Field of Classification Search
CPC ........... G06Q 30/0635; G06Q 30/04; G06F 17/30377; G06F 17/30; G06F 17/30368; G06F 9/543
USPC ......... 707/802, 999.102, 999.107; 705/26.81, 705/34, 35, 40, 7.29
See application file for complete search history.

(56) References Cited

U.S. PATENT DOCUMENTS

| | | | |
|---|---|---|---|
| 6,106,569 A * | 8/2000 | Bohrer et al. | 717/100 |
| 2002/0049627 A1 * | 4/2002 | Goli et al. | 705/10 |
| 2002/0073114 A1 * | 6/2002 | Nicastro et al. | 707/500 |
| 2004/0111428 A1 * | 6/2004 | Rajan et al. | 707/102 |
| 2004/0193653 A1 * | 9/2004 | Howard et al. | 707/200 |
| 2005/0021537 A1 * | 1/2005 | Brendle et al. | 707/100 |
| 2005/0021563 A1 * | 1/2005 | Shaburov | 707/104.1 |
| 2005/0188306 A1 * | 8/2005 | Mackenzie | 707/3 |
| 2005/0235208 A1 * | 10/2005 | Arend et al. | 715/712 |
| 2005/0235223 A1 * | 10/2005 | Arend et al. | 707/102 |
| 2007/0156716 A1 * | 7/2007 | Said et al. | 707/100 |
| 2007/0162491 A1 * | 7/2007 | Schmitz et al. | 707/103 R |
| 2010/0287145 A1 * | 11/2010 | Zeier et al. | 707/705 |

OTHER PUBLICATIONS

"Keep your Web clippings in Outlook Notes", Outlook Help, Microsoft Corp, http://office.microsoft.com/en-us/outlook-help/keep-your-web-clippings-in-outlook-notes-HA001116543.aspx.*
Michael Otey; Windows Vista Sidebar gadget; published in Windows IT Pro, Nov. 2008 Edition (http://windowsitpro.com/article/articleid/100422/windows-vista-sidebar-gadgets.html).
Tomboy; Copyright 2004-2007(http://projects.gnome.org/tomboy/).
Sticky Notes; Copyright 2002-2009 Sticky-Notes.net (http://www.sticky-notes.net/).
Notes in Microsoft Office Outlook; Create a note; 2010 Microsoft Corporation (http://office.microsoft.com/en-us/outlook/HP012341381033.aspx?pid=CH100779941033).
Comments in Microsoft Office Word; Insert a comment; 2010 Microsoft Corporation (http://office.microsoft.com/en-us/word/HP052565281033.aspx?pid=CH063555981033).
Excel Comments—Basics; Contextures Inc., Copyright 2009 (http://www.contextures.com/xlcomments01.html).
Xsticky-Addon (Sticky-Notes) 1.3; Feb. 26, 2010 (https://addons.mozilla.org/en-US/firefox/addon/61266).

* cited by examiner

*Primary Examiner* — Debbie Le

(57) ABSTRACT

A system and method for creating notes for business object instances are described. In various embodiments, a system includes modules to receive note data and bind notes to business object instances. In various embodiments, the system saves notes to a database via a dedicated database connection in a dedicated transaction. In various embodiments, a user interface is provided for creating and modifying notes on business content. In various embodiments, a method for creating notes in a user interface and attaching the notes to one or more positions in a user interface screen displaying business content in an enterprise information system is presented.

19 Claims, 7 Drawing Sheets

GENERATING AND BINDING NOTES TO BUSINESS OBJECTS

TECHNICAL FIELD

The invention relates generally to creating content for business objects, and more specifically, to creating and modifying notes for business objects.

BACKGROUND

Enterprise Information Systems (EIS) provide a technology platform for the modelling and management of business processes and activities. An EIS typically models activities related to the operation of an enterprise, such as human resources, accounting, finance, plant management, sales and distribution, marketing, fleet management, warehouse management, and others. An EIS may model business processes via business objects that could represent tasks or activities of an enterprise, for example.

Extending an EIS is a time-consuming and resource-consuming process and runtime extensions are generally not available on an EIS. Because of the complexity associated with an EIS, extending an EIS involves modelling additional components for the system in a design time environment, testing such additional components, and deploying such additional components in the runtime of the EIS.

Some EIS offer static extension mechanisms that require the generation of extensions in a design time environment. Such extensions require development effort and additional resources such as time, human effort, and funds. Thus, such extensions cannot be provided on-demand.

Further, information pertaining to a business object in an EIS may be tightly coupled to the business object itself; and all changes to the business object may require to be performed in the same transaction with the business object, thus affecting the business object and all instances of the business object.

In hosted on-demand systems, it may be relevant to keep data in each instance of a business object separate from other instances of the business object because each business object instance may be relevant for different organizations sharing the use of the hosted system.

SUMMARY

These and other benefits and features of embodiments of the invention will be apparent upon consideration of the following detailed description of preferred embodiments thereof, presented in connection with the following drawings.

In various embodiments, a system is presented. The system of the embodiments saves notes relevant for a business object instance. The system further manages positioning and visibility settings of notes. The system includes a buffer module to handle buffering and synchronization and a persistence module to save the notes.

In various embodiments, a method is presented. The method includes creating a note in a user interface, attaching the note to a position on a user interface screen and saving the content and position of the node to a database using a dedicated database connection inside a dedicated transaction.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
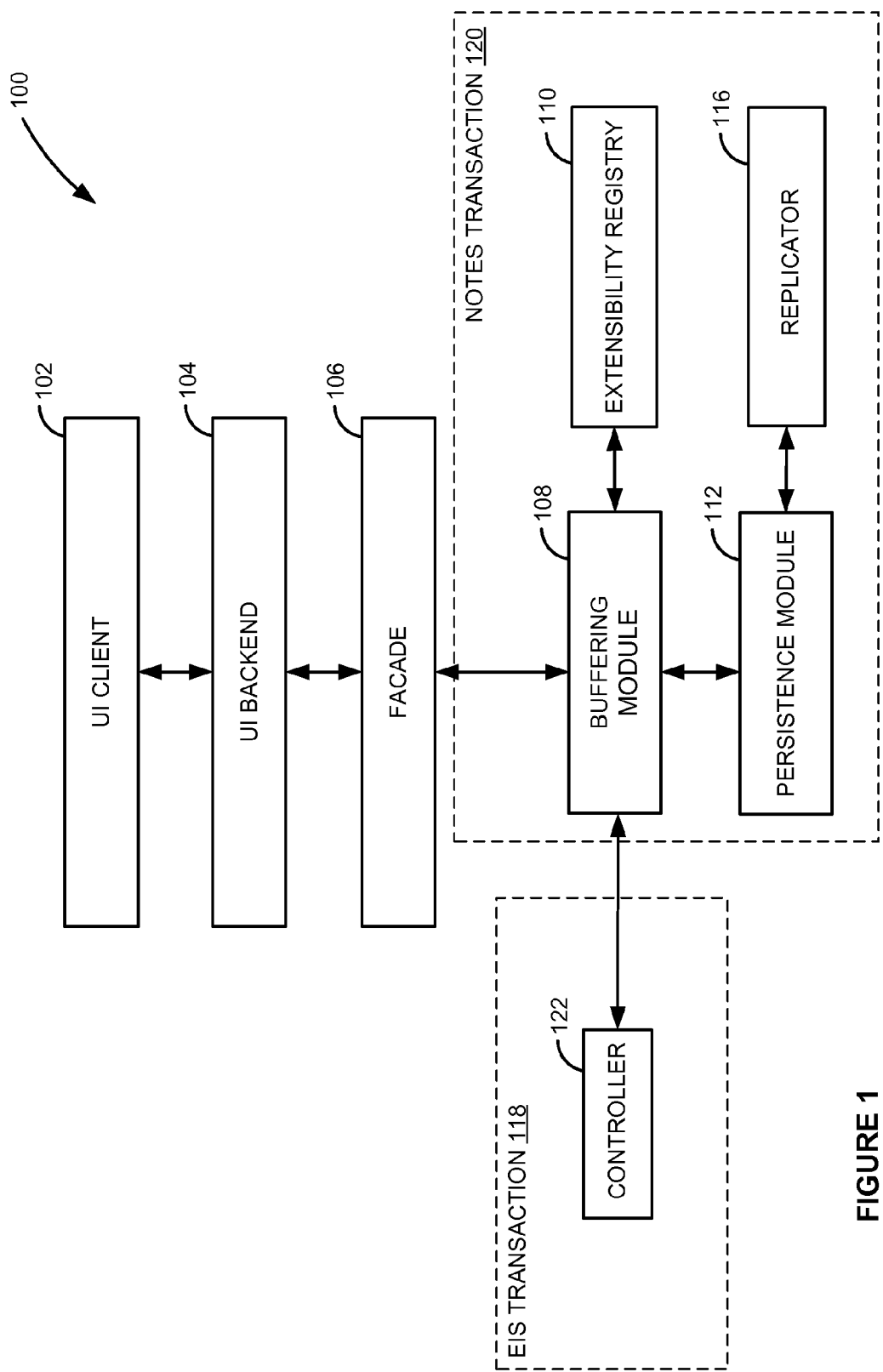
FIG. 1 is a block diagram of an embodiment for receiving and displaying notes on business object instances.

Embodiments of techniques for generating and binding notes to business objects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, an Enterprise Information System (EIS) is presented. An EIS enables organizations to manage their business processes and tasks on an Information Technology (IT) platform. Typically, an EIS includes modules for business activities, such as, but not limited to accounting, finance and controlling, human resources, sales, distribution, procurement, warehouse management, and other modules.

A business object in an EIS represents a physical or logical object pertaining to the business activities of an organization. Business objects may encapsulate business logic for a business process or business task. Examples of business objects may be a sales order, an invoice, an account, and others.

A business object instance in an EIS may represent a particular selection of data from a data source pertaining to the business object. For example, a "sales order" is a business object; and "sales order 001" is a particular instance of the business object "sales order." In another example, "account Smith" is a particular instance of the business object "account."

An EIS may handle work in transactions. Transactions are units of work that are performed by a database system, EIS, or other systems.

In various embodiments, a system may be implemented to provide extensibility for business object instances. Such extensibility may be in the form of notes added to business object instances. The system may provide user interface (UI) elements to receive content for notes in a UI. Such notes and corresponding database connection are persisted in a transaction separate from the general EIS transaction. The system of the embodiments may also display notes which correspond to a visibility setting, thus allowing for public, private, or group visible notes on business object instances. For example, a note may be added to the business object instance "sales order 001" with a visibility setting of "public." Thus, all users of the system with access to the business object instance "sales order 001" will be able to read the note. In another example, a second note may be added to the business object instance "sales order 001" with a visibility setting of "private." In this case, only the user who added the note will be able to read it, while all other public notes would still be available to all users of the business object instance "sales order 001." In a further example, a third note may be added to the "sales order 001" with a visibility setting "group," in which a group of users for whom the note will be visible may be defined.

Using notes, business objects and instances thereof may be enriched with additional information. For example, in a business object "customer," a business object instance would be a particular customer of the organization, such as "customer A." A salesperson handling "customer A" may wish to add additional information on "customer A" as a hint via a note, such as a telephone extension of a contact person at "customer A". In another example, a note may be added to note that a particular customer has particular preferences. Thus, other users working with the customer would have such preferences in mind. However, information provided in a note is relevant for the business object instance and will not be visible in other business object instances. Thus, users of different business object instances will be able to see only the information relevant for the business object instances they have access to.

In various embodiments, a system of the embodiments may receive notes from a user interface and handle such notes in dedicated transactions. Thus, saving information in a note does not trigger a change in the underlying business object of a business object instance. In various embodiments, note content of notes attached to read-only business object instances can be changed.

In various embodiments, a system of the embodiments may save a position of a note relevant for a user of a business object instance. Thus, the same note may be displayed in different UI positions depending on the user.

In various embodiments, there may be many user interfaces or views on top of a business object. The content of a note may be available to all UIs and views of the business object; however, each UI and view may have a different position for the note.

In various embodiments, a "note associated with a business object instance" is a note created for a particular business object instance. The note may only be available in the business object instance it is created in. Other business object instances of the same business objects will not display the note.

FIG. 1 is a block diagram of an embodiment for receiving and displaying notes on business object instances. Referring to FIG. 1, a UI client 102 displays content from an EIS. The UI client 102 receives content from the UI backend 104. The UI backend 104 is responsible for receiving business object content from the EIS transaction 118 and merging that content with the content from the notes transaction 120. The UI backend 104 accesses content via the façade 106. The façade 106 is an abstraction layer that hides the complexity of underlying modules such as buffering module 108, persistence module 110, and replication from the UI backend 104. The façade 106 also simplifies the access to notes content for the UI backend 104. Via the façade 106, the UI backend 104 receives data from a buffering module 108. The buffering module 108 provides buffering services and synchronization services for notes at runtime. Data for notes content and UI position in one or more user sessions is preserved via the buffering module 108. The persistence module 110 provides persistence functionality for notes via a separate database connection in a separate transaction such as notes transaction 120. Via the notes transaction 120 and separate database connection, the system 100 allows for independent notes changes without triggering a save operation of the business object for which the business object instance is relevant. The separate transaction also allows for asynchronous reading of all notes related to a business object instance.

In various embodiments, notes received from the UI client 102 may be saved to the persistence module 112 after a check has determined that the notes for business object instance are relevant and persistent. Such checks may be relevant for concurrency purposes. For example, if a business object instance is newly created, the notes should not persist before the business object instance because in such a case the notes in the database may result in having irrelevant or incorrect data.

In various embodiments, the buffering module 108 may receive data relevant for the note from the controller 122 via data received from the registry. To determine if a business object is relevant for a business object instance, the buffering module 108 may receive data from the extensibility registry 110. The controller may use the EIS transaction 118 to find the business object relevant for the business object instance.

In various embodiments, the controller may implement UI logic relevant for the business object instances and UI screens thereof. Such logic may determine positions of UI elements, interactions between UI elements, and activities of UI elements.

In various embodiments, after a note has been persisted to the persistence module 112, the note may be replicated to a secondary persistence via the replicator 116. Replicating the note to the secondary persistence enables searching operations for notes.

In various embodiments, the EIS transaction may include components pertaining to one or more functions of the EIS related to the business object instance.

In various embodiments, EIS functions may be exposed to the UI backed via enterprise services.

In various embodiments, the components of system 100 may be implemented on one or more servers.

Some benefits of the presented system of FIG. 1 include an integration and propagation of notes to types of UIs based on the same business object and the ability to edit notes attached to read-only UIs. Updates to notes may be saved independently from original business object on editable UIs. The system implements optimistic locking to minimize conflicts. Further, asynchronous updates minimize lock conflicts and improve user experience; changes from parallel sessions are directly available (including newly created notes).

Figure 2:
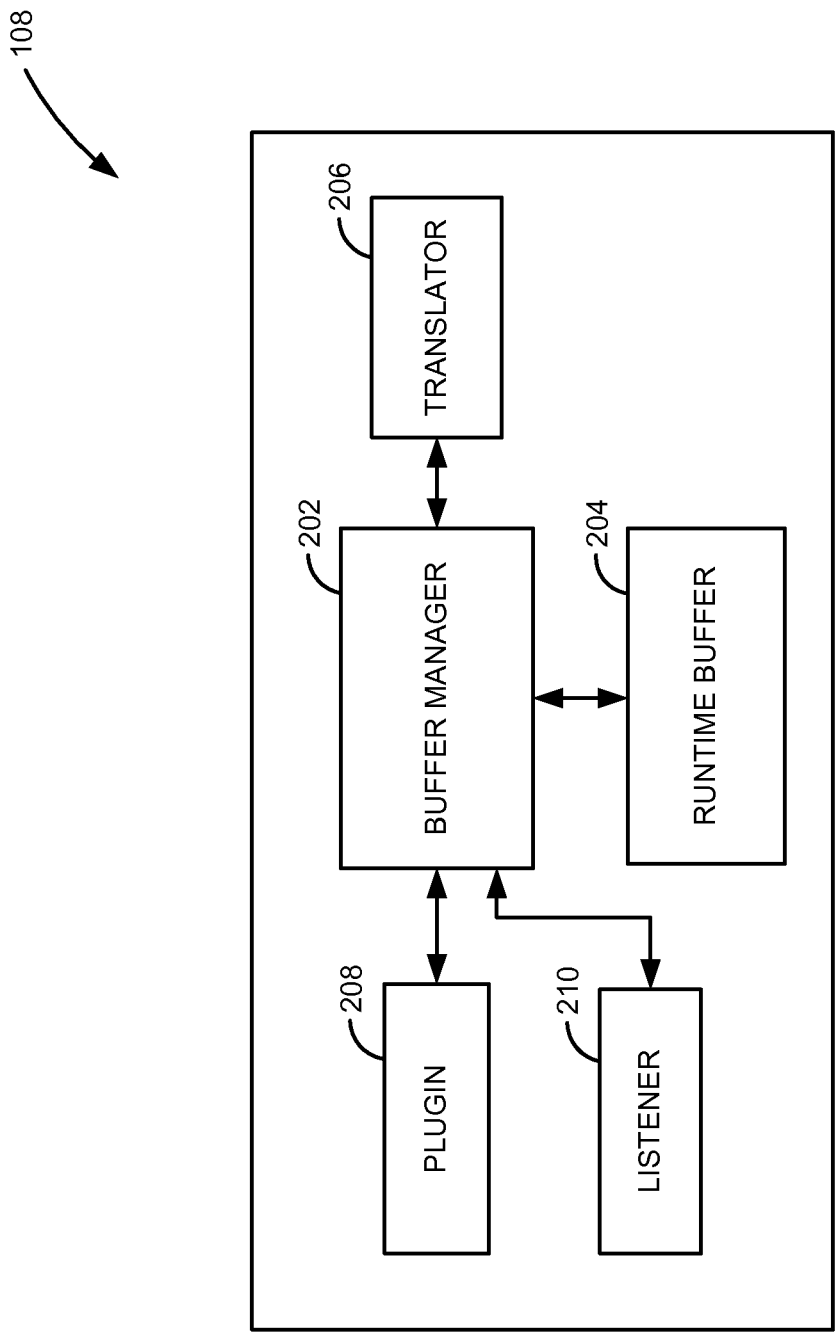
FIG. 2 is a block diagram of a buffering module for notes.

FIG. 2 is a block diagram of a buffering module for notes (e.g., buffering module 108 of FIG. 1) according to various embodiments. Referring to FIG. 2, a buffer manager 202 is responsible for calling the components of the buffering module 108 in the correct order, thus managing all components of the buffering module 108. The buffer manager 202 also controls the buffering of notes during runtime. The runtime buffer 204 enables read, write, and delete operations for notes. The runtime buffer 204 also synchronizes buffer content with content from different sessions, triggers the persistence of notes to a database and the publishing of notes to a UI in one or more sessions. For example, if a user changes a note in a session, the runtime buffer 204 may save the new note content or position (or both) and publish the updated note to other sessions of other users of a business object instance. Updated positions of notes may be updated on parallel user session whenever users refresh their screens. Sending updates of positions on a refresh may be used to prevent conflicts on UI screens and to prevent UI elements from changing positions while users are viewing or using the screen.

In various embodiments, the plugin 208 and listener 210 handle synchronization for the buffering module with other entities such as EIS transactions (e.g., EIS transaction 118 of FIG. 1). For example, the plugin 208 performs a check to determine if a business object instance is persistent or not. To determine if a business object instance is persistent, the plugin 208 may access components in the EIS transaction 118 to obtain information about the business object instance. The plugin 208 enables the buffer manager 202 to obtain information from the buffer manager. The translator 206 receives information from a registry (e.g., extensibility registry 110 of FIG. 1), and translates this information in a suitable form for the buffer manager 202 format. The buffer manager 202 may use this information to communicate with the runtime buffer 204.

The listener 210 'listens' for events occurring in the EIS transaction 118. For example, the listener triggers a delete operation for one or more notes relevant for a business object instance if the business object instance is deleted. The listener 210 also may trigger a flush operation if a business object is persisted in the EIS transaction 118. If a business object is persisted, notes content and position on business object instances will also be synchronized to keep the most current notes content in the database. In various embodiments, if a note is created for a first time on a business object instance which is also created for the first time, the business object instance will be saved first. Following the saving of the business object instance, the note will be saved as well.

Figure 3:
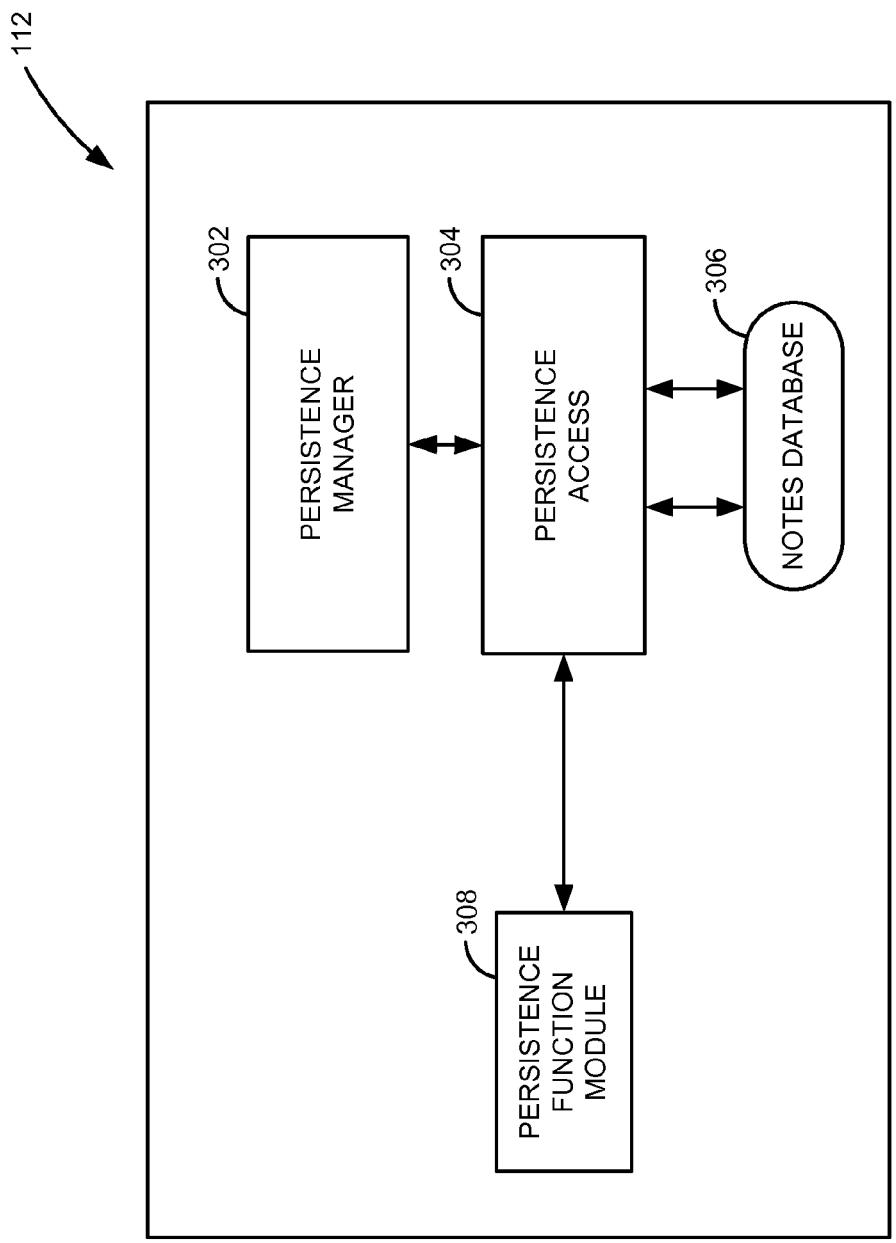
FIG. 3 is a block diagram of a persistence module in accordance with various embodiments.

FIG. 3 is a block diagram of a persistence module (e.g., persistence module 112 of FIG. 1) in accordance with various embodiments. Referring to FIG. 3, the persistence module 112 includes a persistence manager 302. The persistence manager 302 manages persistence functionality for notes. To persist a note, the persistence manager uses a dedicated database connection and a dedicated transaction, so that changes to notes relevant for business object instances do not interfere with any changes to business objects. The persistence access 304 provides and abstraction for the persistence manager 302 for an underlying physical storage medium storing the notes database 306. The persistence manager 302 synchronizes notes with an EIS transaction (e.g., EIS transaction 118 of FIG. 1) via the persistence function module 308.

Figure 4:
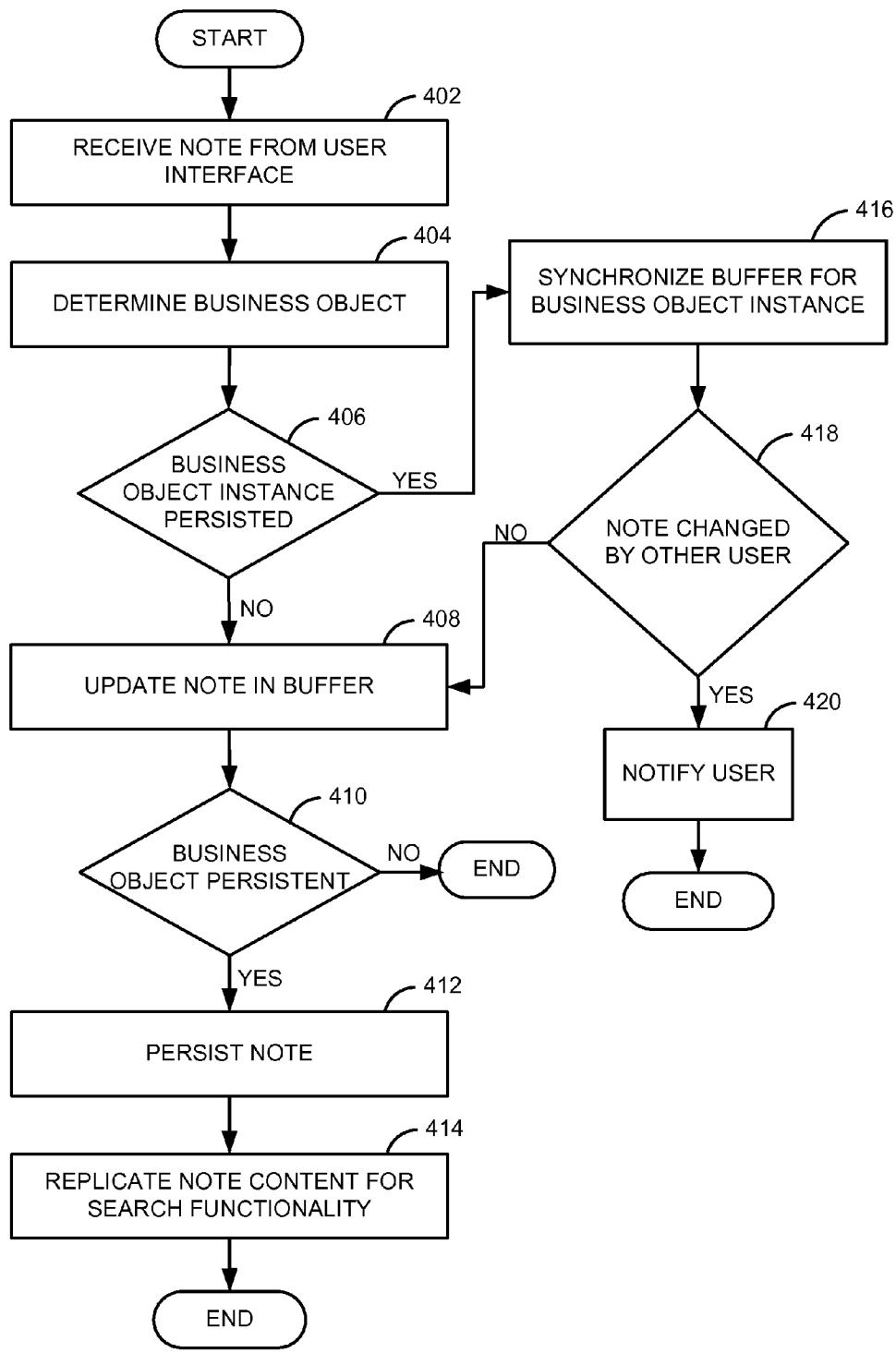
FIG. 4 is a flow diagram of an embodiment of a method for creating a note on a business object instance.

FIG. 4 is a flow diagram of an embodiment of a method for creating a note on a business object instance. Referring to FIG. 4, at process block 402, a note is received from a UI. At process block 404, a business object relevant for the note is determined. The business object may be determined using data from a registry. Data in the registry may include names and identifiers of objects relevant to a business object instance, such as a business object and a controller object that has called the business object.

At process block 406, a check is performed to determine if a business object instance relevant for the note and the business object is persistent. If the business object instance is not persistent, at process block 408, the received note is updated in a buffer. At process block 410, a check is performed to determine if the business object is persistent. If the business object is persistent, at process block 412, the note is persisted to a storage medium such as a database.

In various embodiments, the note may also be replicated to enable search functionality for notes.

In various embodiments, if the business object instance is persisted, the buffer is synchronized at process block 416. At process block 418, a check is performed to determine if the note has been changed by another user. If the note has been changed, at process block 420, the user is notified via an information message. In various embodiments, this check may be referred to as 'optimistic locking.' Optimistic locking is a concept that may refer to throwing an error if the item has been changed by another entity. With this concept, an entity (e.g., application, object, etc.) that wishes to change and item may not need to obtain an explicit lock on the item before performing the change. If the note has not been changed, the note is updated in the buffer at process block 408.

In various embodiments, the process as described in FIG. 4 may be performed by components as described in FIG. 1.

Figure 5:
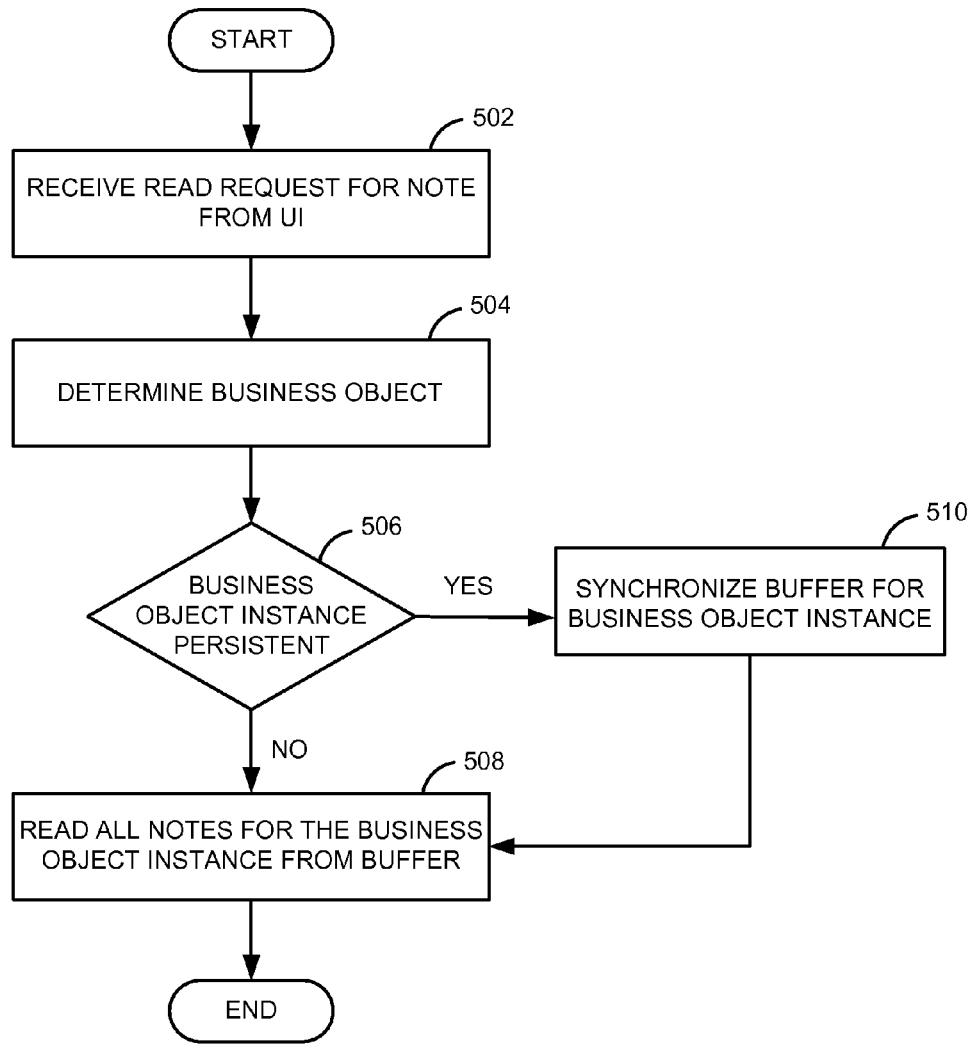
FIG. 5 is a flow diagram of an embodiment for reading one or more notes relevant for a business object instance.

FIG. 5 is a flow diagram of an embodiment for reading one or more notes relevant for a business object instance. Referring to FIG. 5, at process block 502, a read request for notes is received. At process block 504, a business object relevant for the one or more notes is determined. At process block 506, a check is performed to determine if the business object instance of the determined business object is persistent. If the business object instance is persistent, at process block 510, a buffer is synchronized to a database to retrieve a current content relevant for the business object instance (e.g., relevant notes and positions). At process block 508, the notes for the business object instance are read.

In various embodiments, the process as described in FIG. 5 is performed by components as described in FIG. 1.

Figure 6:
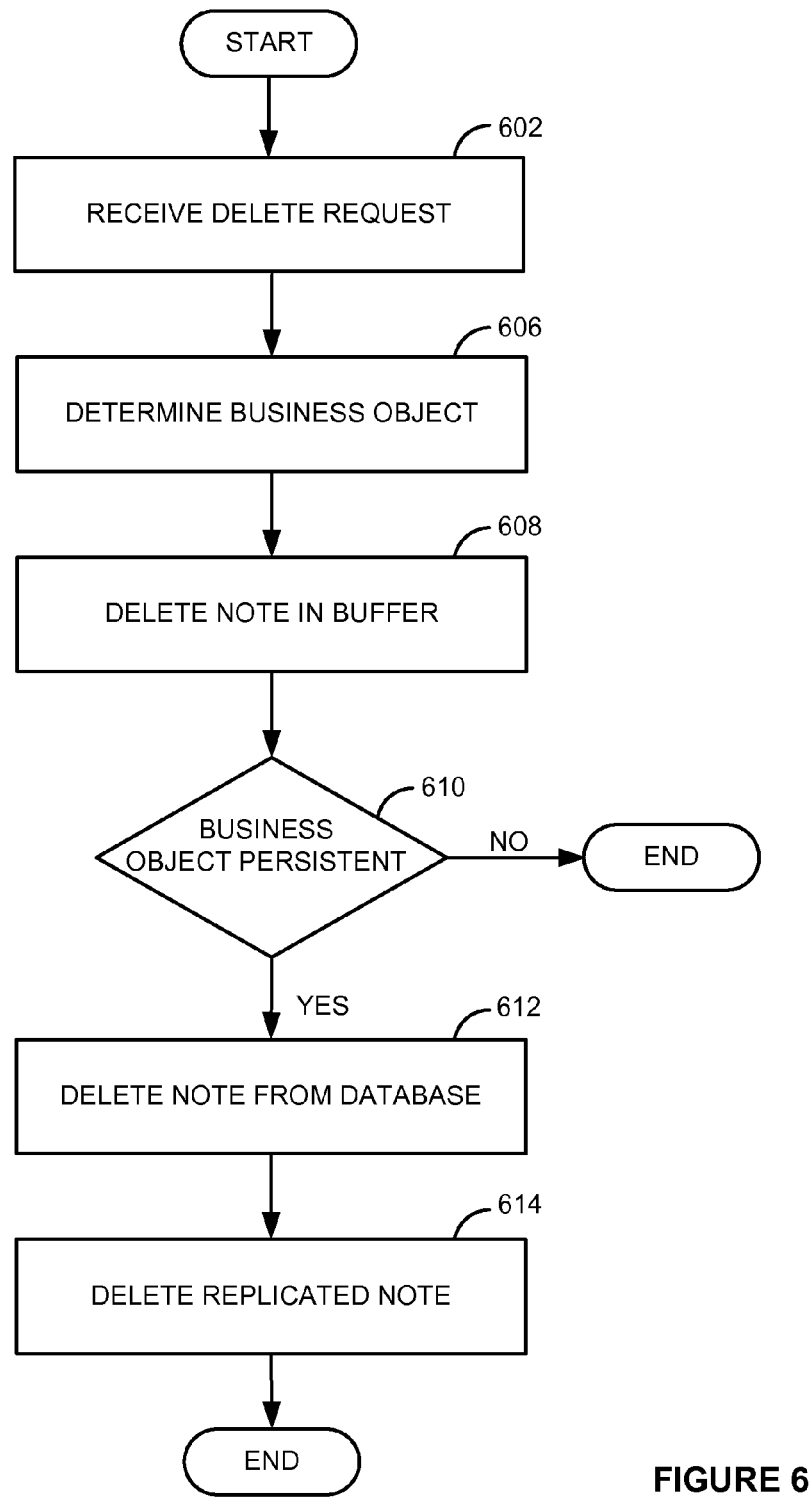
FIG. 6 is a flow diagram of an embodiment for deleting one or more notes relevant for a business object instance.

FIG. 6 is a flow diagram of an embodiment for deleting one or more notes relevant for a business object instance. Referring to FIG. 6, at process block 602, a delete request for a note is received. At process block 606, a business object relevant for the notes is determined. At process block 608, the note is deleted from the buffer. At process block 610, a check is performed to determine if the business object is persistent. If the business object is persistent, at process block 612, the note is deleted from a database. At process block 614, a replicated note for search functionality is deleted.

In various embodiments, the process as described in FIG. 6 is performed by components as described in FIG. 1.

The architecture described in FIGS. 1 through 3 and the processes described in FIGS. 4 through 6 allow for the implementation and configuration of an EIS that enables end users with no technical knowledge to extend the system. Thus, time, funds, and resources may be saved. Further, such an EIS may deliver rich user-specific and instance-specific content to facilitate collaboration and information exchange.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any article that is capable of undergoing a set of changes to store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
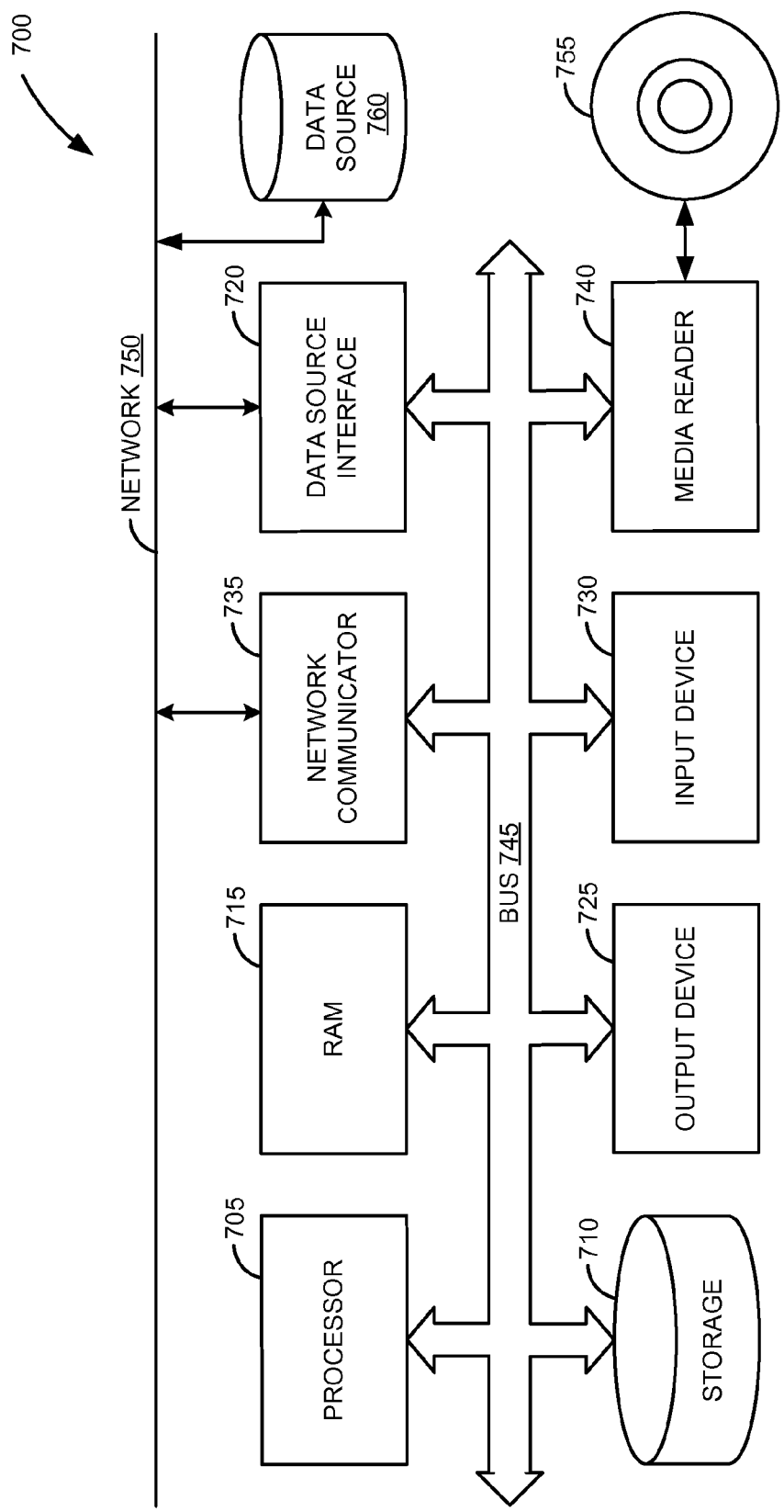
FIG. 7 is an exemplary block diagram of a system of an embodiment.

FIG. 7 is a block diagram of an exemplary computer system 700. The computer system 700 includes a processor 705 that executes software instructions or code stored on a computer readable medium 755 to perform the above-illustrated methods of the invention. The computer system 700 includes a media reader 740 to read the instructions from the computer readable medium 755 and store the instructions in storage 710 or in random access memory (RAM) 715. The storage 710 provides a large space for keeping static data where at least some instructions could be stored for later execution. The stored instructions may be further compiled to generate other representations of the instructions and ally stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be access via one or more abstraction layers implemented in hardware or software. For example, the data source 760 may be access by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, one or more reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer-readable storage device having computer readable instructions tangibly stored thereon which when executed by the computer, cause the computer to perform a method for creating notes associated with business object instances, the method comprising:
   receiving a note associated with a business object instance from a user interface through a first transaction during a first session;
   determining whether the business object instance is persisted;
   upon determining that the business object instance is not persisted, updating the note from the user interface to a buffer on a server;
   determining whether a business object to which the business object instance belongs is persisted; and
   upon determining that the business object is persisted, creating a dedicated database connection and storing the note updated in the buffer in a notes database via the dedicated database connection through a dedicated second transaction that is separate from the first transaction.

2. The computer-readable storage device of claim 1, wherein receiving the note from the user interface comprises:
   receiving a content associated with the note; and
   receiving a position of the note on the user interface.

3. The computer-readable storage device of claim 1, wherein the method further comprises replicating the note associated with the business object instance in a second database on the server to enable search functionality.

4. The computer-readable storage device of claim 1, wherein determining whether the business object instance is persisted comprises:

receiving data associated with the note from a registry on the server;

querying a controller on the server with the data associated with the note from the registry;

receiving the business object relevant for the note from the controller; and determining whether the business object instance relevant for the note and the business object is persistent or not.

5. The computer-readable storage device of claim 1, wherein updating the note from the user interface to the buffer comprises:

recording a content and a position associated with the note in the first session;

merging the content and the position associated with the note from the first session; and propagating the content and the position associated with the note to a plurality of sessions.

6. The computer-readable storage device of claim 5, wherein the method further comprises:

receiving a read request for the note;

receiving a write request for the note; and receiving a delete request for the note.

7. The computer-readable storage device of claim 1, wherein the method further comprises:

checking whether the note has been changed in a second session in the user interface; and sending an error message to the second session in the user interface upon determining that a write request is received from the second session for the note.

8. The computer-readable storage device of claim 1, wherein the method further comprises setting a visibility option for the note, wherein the visibility option is one of:

a "public" option allowing access to the note to all users of a system;

a "private" option allowing access to the note to a note creator; and a "group" option allowing access to the note to a user group.

9. A computerized system including a processor, the processor communicating with at least one memory device storing instructions, the instructions comprising:

a user interface operable to display a note associated with a business object instance, wherein the note is received through a first transaction;

a buffering module on a server operable to receive changes to the note associated with the business object instance; and a persistence module on the server operable to persist the note associated with the business object instance when a business object, to which the business object instance belongs, is persisted, wherein the note is persisted using a dedicated database connection through a dedicated second transaction that is separate from the first transaction.

10. The computerized system of claim 9, wherein the user interface is further operable to provide one or more user interface elements for:

expanding and collapsing the note associated with the business object instance;

editing the note associated with the business object instance; and changing a position of the note associated with the business object instance.

11. The computerized system of claim 9, wherein the buffering module is further operable to:

synchronize the changes of the note associated with the business object instance to a business object in an enterprise information system; and synchronize the changes of the note associated with the business object instance in the user interface with a database on the server.

12. The computerized system of claim 9, wherein the buffering module comprises:

a translator to transform registry data correspondingly relevant to a business object associated with the business object instance; and a buffer manager operable to receive the registry data from the translator and query a controller for the business object associated with the business object instance via a plugin.

13. The computerized system of claim 9, wherein the buffering module further comprises:

a runtime buffer operable to service read, write, and delete requests for the note associated with the business object instance; and a listener to synchronize the read, write, and delete requests with a database.

14. The computerized system of claim 9, wherein the persistence module comprises:

a persistence manager to service requests from a buffer manager for the note associated with the business object instance;

a notes database to receive the note associated with the business object instance from the persistence manager; and a persistence function module to synchronize the note associated with the business object instance with a transaction relevant for the business object instance.

15. A computerized method, comprising:

receiving a content associated with a note associated with a business object instance from a user interface, through a first transaction;

determining whether the business object instance is persisted;

upon determining that the business object instance is not persisted, storing the content associated with the note to a buffer on a server; determining whether a business object to which the business object instance belongs is persisted; and upon determining that the business object is persisted, creating a dedicated database connection and storing the content associated with the business object instance in a notes database via the dedicated database connection through a dedicated second transaction that is separate from the first transaction.

16. The method of claim 15, further comprising:

replicating the content associated with the note to enable searching functionality.

17. The method of claim 15, further comprising:

generating a screen relevant for the business object instance;

determining a business object relevant for the business object instance;

determining that the business object instance is persistent via the business object; and synchronizing the buffer to a database to receive the at least one note from the database upon determining that the business object instance is persistent.

18. The method of claim 15, further comprising:

sending a delete request to the buffer on the server;

determining whether a business object associated with the business object instance is persistent;

deleting the note in the buffer on the server upon determining that the business object is not persistent; and deleting the note in a database via the business object upon determining that the business object is persistent.

19. The computerized method of claim 15, further comprising setting a visibility option, wherein the visibility option is one of:

a "public" option allowing access to the note associated with the business object instance to all users of a system;

a "private" option allowing access to the note associated with the business object instance to a note creator; and a "group" option allowing access to the note associated with the business object instance to a user group.

\* \* \* \* \*